(12) United States Patent
Liu et al.

(10) Patent No.: US 7,382,495 B2
(45) Date of Patent: Jun. 3, 2008

(54) REDUCTION OF DIFFERENTIAL GLOSS

(75) Inventors: Chu-Heng Liu, Penfield, NY (US); Beilei Xu, Penfield, NY (US); Shen-Ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 883 days.

(21) Appl. No.: 10/876,000

(22) Filed: Jun. 24, 2004

(65) Prior Publication Data

US 2005/0128523 A1    Jun. 16, 2005

Related U.S. Application Data

(60) Provisional application No. 60/529,186, filed on Dec. 12, 2003.

(51) Int. Cl.
*H04N 1/405* (2006.01)
*B41M 3/10* (2006.01)

(52) U.S. Cl. ............. 358/3.06; 358/3.2; 358/3.28

(58) Field of Classification Search ............. 358/1.9, 358/3.06, 3.13–3.2, 3.26–3.28, 533–536; 382/237, 270; 428/195.1; 399/341–342; 283/91, 93; 430/45.53
See application file for complete search history.

(56) References Cited

U.S. PATENT DOCUMENTS

| | | | | |
|---|---|---|---|---|
| 3,784,289 A | * | 1/1974 | Wicker | 283/93 |
| 4,149,194 A | * | 4/1979 | Holladay | 358/3.16 |
| 4,210,346 A | | 7/1980 | Mowry, Jr. et al. | 283/93 |
| 4,310,180 A | | 1/1982 | Mowry, Jr. et al. | 283/93 |
| 5,087,507 A | | 2/1992 | Heinzer | 428/195 |
| 5,229,867 A | | 7/1993 | Ershov et al. | |
| 5,234,783 A | * | 8/1993 | Ng | 430/45.53 |
| 5,487,567 A | | 1/1996 | Volpe | 283/72 |
| 5,583,660 A | | 12/1996 | Rylander | 358/3.17 |
| 5,678,133 A | | 10/1997 | Siegel | 399/67 |
| 5,695,220 A | | 12/1997 | Phillips | 283/91 |
| 5,710,636 A | * | 1/1998 | Curry | 358/3.28 |

(Continued)

FOREIGN PATENT DOCUMENTS

EP    0 859 506 A1    8/1998

(Continued)

OTHER PUBLICATIONS

Shen-ge Wang et al., U.S. Appl No. 10/159,432, filed May 30, 2002, entitled "Application of Glossmarks for Graphics Enhancement" (D/A1744).

(Continued)

*Primary Examiner*—Scott A. Rogers
(74) *Attorney, Agent, or Firm*—Christopher D. Wait

(57) ABSTRACT

A method for reduction of differential gloss as found in hardcopy image prints. The method comprises selecting a first halftone having a high apparent gloss characteristic and a second halftone having a low apparent gloss characteristic while retaining an identical matching density characteristic to the first selected halftone. a A determination is then made of which areas of the halftone image correspond to potentially high gloss and low gloss regions under normal printing conditions. The first halftone is applied to those portions of the halftone image determined as corresponding to potentially low gloss regions, and the second halftone is applied to those portions of the halftone image determined as corresponding to potentially high gloss regions of the halftone image.

26 Claims, 3 Drawing Sheets

U.S. PATENT DOCUMENTS

| | | | | |
|---|---|---|---|---|
| 5,734,752 | A | 3/1998 | Knox | 382/212 |
| 5,751,432 | A * | 5/1998 | Gwaltney | 358/296 |
| 5,788,285 | A | 8/1998 | Wicker | 283/93 |
| 5,853,197 | A | 12/1998 | Mowry, Jr. et al. | 283/91 |
| 6,108,512 | A | 8/2000 | Hanna | 399/366 |
| 6,606,168 | B1 * | 8/2003 | Rylander | 358/3.09 |
| 6,714,320 | B1 * | 3/2004 | Nakahara et al. | 358/3.13 |
| 6,763,121 | B1 * | 7/2004 | Shaked et al. | 382/100 |
| 6,906,825 | B1 * | 6/2005 | Nakahara et al. | 358/1.9 |
| 7,020,349 | B2 * | 3/2006 | Brunk | 382/289 |
| 7,092,128 | B2 * | 8/2006 | Wang et al. | 358/3.06 |
| 7,126,721 | B2 * | 10/2006 | Wang et al. | 358/3.06 |
| 7,139,101 | B2 * | 11/2006 | Loce et al. | 358/3.06 |
| 7,139,521 | B2 * | 11/2006 | Ng et al. | 399/341 |
| 7,148,999 | B2 * | 12/2006 | Xu et al. | 358/3.06 |
| 7,180,631 | B2 * | 2/2007 | Ide et al. | 358/1.9 |
| 7,180,635 | B2 * | 2/2007 | Wang et al. | 358/3.06 |
| 7,193,751 | B2 * | 3/2007 | Wang et al. | 358/3.06 |
| 2005/0025333 | A1 * | 2/2005 | Fujii et al. | 382/100 |
| 2005/0031160 | A1 * | 2/2005 | Shaked et al. | 382/100 |
| 2005/0128524 | A1 * | 6/2005 | Liu et al. | 358/3.06 |
| 2005/0135851 | A1 * | 6/2005 | Ng et al. | 399/341 |
| 2005/0286083 | A1 * | 12/2005 | Wang et al. | 358/3.06 |
| 2006/0044617 | A1 * | 3/2006 | Wang et al. | 358/3.06 |
| 2006/0072159 | A1 * | 4/2006 | Eschbach et al. | 358/3.06 |
| 2006/0127117 | A1 * | 6/2006 | Eschbach et al. | 399/67 |
| 2007/0139714 | A1 * | 6/2007 | McElvain | 358/3.06 |

FOREIGN PATENT DOCUMENTS

| | | |
|---|---|---|
| EP | 1 367 810 A2 | 12/2003 |
| EP | 1 370 062 A1 | 12/2003 |
| EP | 1705529 A1 * | 9/2006 |
| EP | 1705531 A1 * | 9/2006 |
| GB | 2 217 258 A | 10/1989 |

OTHER PUBLICATIONS

Shen-ge Wang et a., U.S. Appl No. 10/159,423, filed May 30, 2002, entitled "Halftone Image Gloss Control For Glossmarks" (D/A1749).

Beilei Xu et al., U.S. Appl. No. 10/186,065, filed Jun. 27, 2002, entitled "Variable Glossmark" (D/A1745).

F. R. Ruckdeschel et al., "Yute-Nielsen effect in printing: a physical analysis", *Applied Optics*, vol. 17, No. 21, Nov. 1, 1978, pp. 3376-3383.

* cited by examiner

REDUCTION OF DIFFERENTIAL GLOSS

CLAIM OF PRIORITY TO PROVISIONAL APPLICATION

This application claims the benefit of U.S. Provisional Application No. 60/529,186, filed Dec. 12, 2003, the disclosure of which is totally incorporated herein by reference.

CROSS-REFERENCE TO RELATED APPLICATIONS

Cross reference is made to the following applications, the disclosures of each of which are totally incorporated by reference herein: U.S. patent application Ser. No. 10/159,423 entitled "HALFTONE IMAGE GLOSS CONTROL FOR GLOSSMARKS" to inventors Shen-ge Wang, Beilei Xu, and Chu-heng Liu; U.S. patent application Ser. No. 10/159,432 entitled "APPLICATION OF GLOSSMARKS FOR GRAPHICS ENHANCEMENT" to inventors Shen-ge Wang, Beilei Xu, and Chu-heng Liu; U.S. patent application Ser. No. 10/186,065 entitled "VARIABLE GLOSSMARK" to inventors Beilei Xu, Shen-ge Wang, and Chu-heng Liu. The appropriate components and processes of the above co-pending applications may be selected for the disclosure of the present application in embodiments thereof.

BACKGROUND AND SUMMARY

The present disclosure relates generally to the gloss inherent in the hardcopy of image data be it pictorial or text. More particularly, this disclosure relates to digital image data and the control of differential gloss when that digital image data is printed into hardcopy.

The acceptance of electrostaticgraphic print engines by the graphic arts and commercial print market has heretofore been hampered by various problems, including among them a perceived image quality issue relative to differential gloss. Typical electrostaticgraphic prints, including traditional xerographic prints, usually display high gloss in high mass regions. In the mid-tone regions the image gloss on a glossy substrate reaches a minimum. This differential gloss between high mass and mid-tone areas is objected to by some users.

A typical approach in the past has been to reduce the gloss in the high mass areas through toner and fusing optimization. However, this kind of approach also reduces the overall image gloss at the same time. This in turn upsets another group of users who find the typical glossy appearance of xerographic prints desirable.

Therefore, as discussed above, there exists a need for an arrangement and methodology which will control gloss in general and allow manipulation for overcoming differential gloss without requiring special toners/inks or changes in the fusing operation. Thus, it would be desirable to solve this and other deficiencies and disadvantages as discussed above, with an improved methodology for the manipulation of inherent differential gloss.

Disclosed in embodiments herein is a method for the manipulation of the differential gloss in a halftone image. The method comprises selecting a first halftone having a high apparent gloss characteristic and a second halftone having a low apparent gloss characteristic while retaining an identical matching density characteristic to the first selected halftone. The first halftone is applied to at least some portion of the halftone image, and the second halftone is applied to the remaining portion of the halftone image.

Also disclosed in embodiments herein is a method for the manipulation of the differential gloss in a halftone image. The method comprises selecting a first halftone having a high apparent gloss characteristic and a second halftone having a low apparent gloss characteristic while retaining an identical matching density characteristic to the first selected halftone. Then a determination is made of which areas of the halftone image correspond to potentially high gloss regions under normal printing conditions. The second halftone is applied to those portions of the halftone image determined as corresponding to potentially high gloss regions, and the first halftone is applied to the remaining portions of the halftone image.

Also disclosed in embodiments herein is a method for the manipulation of the differential gloss in a halftone image. The method comprises selecting a first halftone having a high apparent gloss characteristic and a second halftone having a low apparent gloss characteristic while retaining an identical matching density characteristic to the first selected halftone. Then a determination is made of which areas of the halftone image correspond to potentially low gloss regions under normal printing conditions. The first halftone is applied to those portions of the halftone image determined as corresponding to potentially low gloss regions, and the second halftone is applied to the remaining portions of the halftone image.

Further disclosed in embodiments herein is a method for the manipulation of the differential gloss in a halftone image. The method comprises selecting a first halftone having a high apparent gloss characteristic and a second halftone having a low apparent gloss characteristic while retaining an identical matching density characteristic to the first selected halftone. Then a determination is made of which areas of the halftone image correspond to potentially high gloss and low gloss regions under normal printing conditions. The first halftone is applied to those portions of the halftone image determined as corresponding to potentially low gloss regions, and the second halftone is applied to those portions of the halftone image determined as corresponding to potentially high gloss regions of the halftone image.

DETAILED DESCRIPTION

The disclosure provided herein is motivated by the recent discovery that image gloss is strongly affected by halftone structures. We have also determined that image density and regular perception can remain intact while image gloss is varied through the changing of halftone structures. With this new understanding, there is described herein how to use different halftone structures to enhance the gloss of low gloss regions and/or to reduce the gloss of high gloss regions to decrease the differential gloss that is objectionable some users. By proper utilization of the perceived different gloss levels inherent between various halftone structures, the desired manipulation of perceived gloss and the reduction of differential gloss may be achieved without the need for overall image gloss reduction or employment of special toners or fusing optimization. The determination of which image areas receive which halftone structures may be selected as based upon local density alone as an automatic image enhancement feature or by way of various segmentation techniques alone or in combination.

Figure 1:
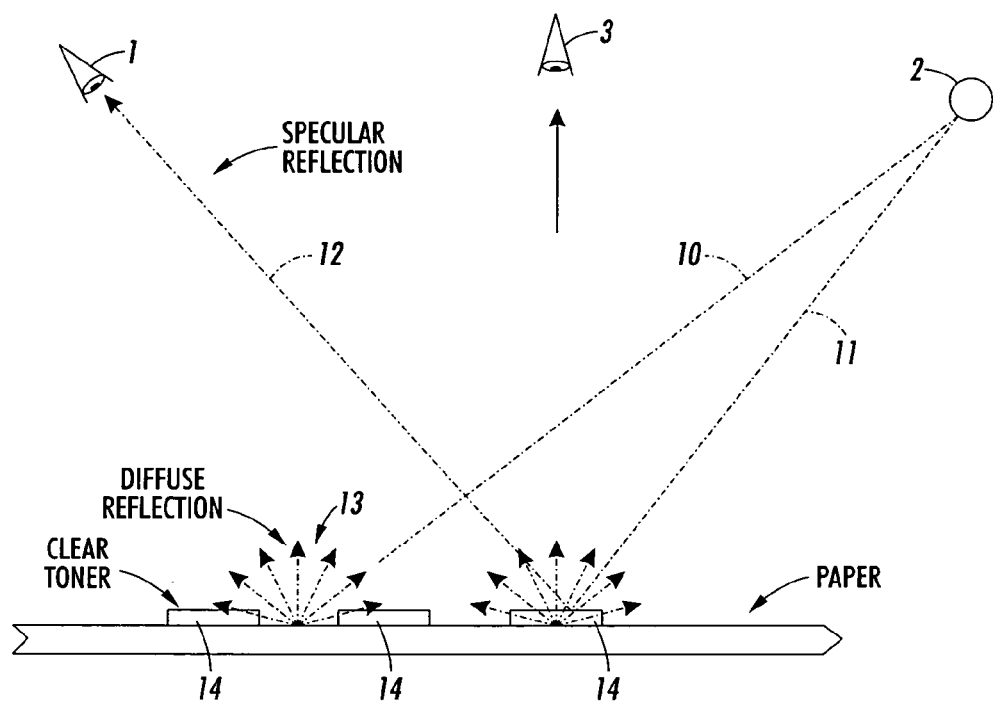
FIG. 1 shows how the human eye can detect a large difference between the glossy portions of the page.

FIG. 1 shows how the human eye at position 1 can read gloss upon the page and a scanner cannot. Three glossy toner areas 14 are shown. One ray of light 10 from the light source 2 hits the paper at a point where there is no gloss toner 14, and the reflected light 13 is diffused so that there is only a small amount of light in all directions, including the direction toward the human eye at position 1. Another ray of light 11 of equal intensity touches the paper at a point where there is gloss toner 14. Here, there is a large amount of reflected light 12 in the indicated direction. If the human eye is positioned as shown at position 1, a large difference between glossy and non-glossy areas is readily observable by the human eye. However, if placed at position 3 the incident light is at right angles to the paper. In this case, there is only a small amount of diffused light coming from both the glossy and non-glossy areas, and the eye can not detect much difference.

Printed images typically display gloss which is different from the that of the substrate they are printed upon. This is due to the physical nature of the marking materials (toner or ink) employed. These toner or ink materials will scatter light and thus in turn affect the image gloss as dependent upon their material properties and the manner in which they are directed in application. Heretofore, there has been little appreciation for the fact that there are inherent reflective and diffusive characteristics inherent in halftones which may be manipulated by selective choice of the applied halftone structure.

It has been typically misunderstood that the image gloss at different area coverage's is just a linear interpolation of the substrate and image gloss weighted by the area coverage. One false conclusion flowing from this assumption is that there is a one-to-one relationship between image density and gloss. However, as disclosed in U.S. patent application Ser. No. 10/159,423 "HALFTONE IMAGE GLOSS CONTROL FOR GLOSSMARKS" incorporated above, images with the same toner coverage and density can produce very different gloss display through toner/ink and halftone structure variations. The present application is directed to teaching a methodology to use halftone structure manipulation to reduce the differential gloss for a hardcopy printed image.

In one possible embodiment for use in the relatively simple scenario of monochrome printing, the average mass per unit area of different image areas is completely determined by the density of a single separation. To reduce the differential gloss of the print, the gloss enhancing/reduction functionality of the halftone scheme is tied to the image density/color. In the high mass/density regions, halftone structures that will yield low gloss are employed. In the mid-tone regions, the digital imaging system is directed to apply gloss enhancing halftone structures to render those image regions. In this way the differential in gloss between the two density regions is reduced or even eliminated. Furthermore, the avoidance of halftone structures that provide a strong anisotropic gloss characteristic, (and taught as desirable in U.S. patent application Ser. No. 10/159,423 "HALFTONE IMAGE GLOSS CONTROL FOR GLOSS-MARKS") is also exemplary in the selection of suitable halftones.

Figure 2:
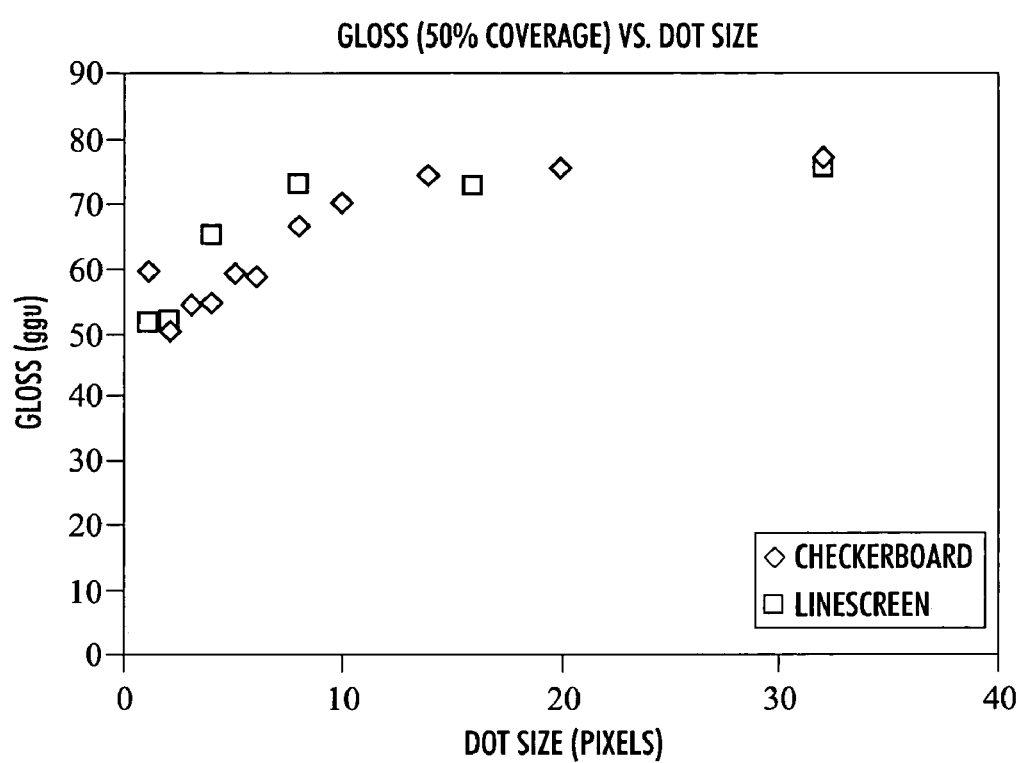
FIG. 2 depicts a chart of the gloss variations found in simple cluster-dot halftones as a function of cluster size.

FIG. 2 depicts how the gloss of halftone structures may vary at various cluster sizes. The cluster size is measured in the unit of pixel at 600 dpi. The comparison provided in the chart of FIG. 2 shows how the gloss may vary when cluster size is changed at a constant density of 50% and with a fixed halftone pattern. In a halftone printing system, the cluster size is inversely proportional to the halftone frequency. Stochastic screen will have the gloss characteristics similar to that of the pattern with cluster size of 1 pixel, while 100~200 lpi cluster dot screen will exhibit glossy appearance close to that of the pattern with greater cluster sizes (~3 pixels). Note for example that a stochastic screen exhibits significantly more gloss than the low frequency (100~200 lpi) cluster dot halftone type around the mid tone range. A simplistic characterization is that by using a coarser screen or halftone type in the high area coverage regions and a finer screen in low area coverage regions, differential gloss can be reduced significantly.

Figure 3:
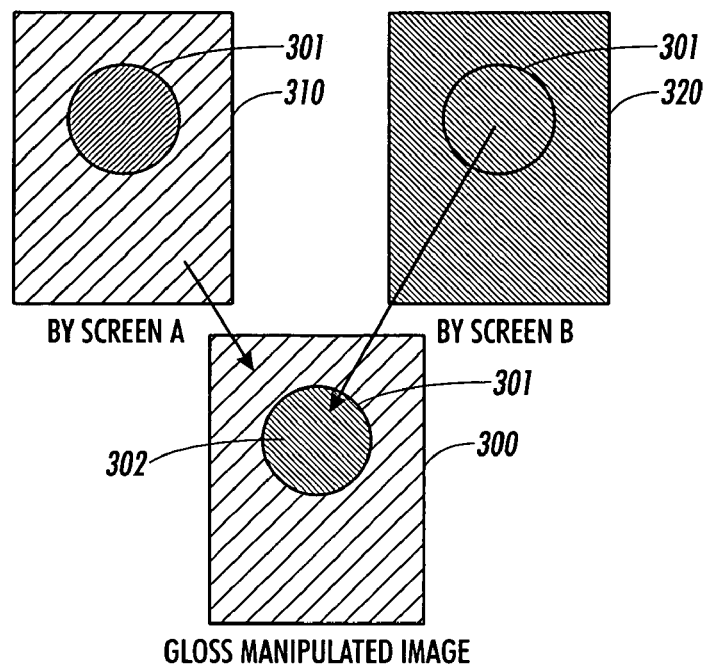
FIG. 3 depicts a patchwork alternating of the two halftone patterns so as to manipulate differential gloss.

FIG. 3 depicts a gloss manipulated image 300 achievable using halftone cells types which vary in gloss as described above. Screen-A 310 uses one halftone cell type and screen-B 320 uses the other. The circle 301 is provided as a visual aid across the image screens 300, 310 and 320. The desired intent here is for a sphere 302 to be perceived in the midst of image 300 as having the same level of gloss as the remainder of image 300. Screen-A 310 provides the field of mid-density oriented halftones and screen 320 provides the spherical area of high-density halftone cells. In this manner, a selection of the two screen types are patch-worked together to create the image 300 with reduced differential gloss.

In more complicated situations such as color image rendering, one typical process to reduce the differential gloss of a printed image consists of the following two steps:
1) IMAGE SEGMENTATION: based on the digital content of the image, determine the potential high gloss and/or low gloss regions under a normal printing condition;
2) DIFFERENTIAL GLOSS REDUCATION: apply gloss-enhancing halftone screen(s) to the low gloss region(s) or/and apply gloss reduction halftone screen(s) to the high gloss region(s).

Under normal printing conditions, process black typically has the highest gloss within an image. Because there are 4 separations to be halftoned to produce process black, there is a significant room for maneuvering the halftone structures. In one embodiment, the high mass process black region is segmented from the rest of the image. In this example, the segmentation criteria is K>70%, C,M,Y>40% in this embodiment. However, It should be understood that this segmentation criteria can be different for different printers and can even be different for different image contents. Once the segmentation map is obtained, in the high mass segments, a 141 lpi cluster dot screen set is employed (although any lpi from 100-250 may be employed) while a stochastic screen is applied to the other regions. The gloss of the high mass regions (for example the hair in one image) was reduced from 95 to 80. Differential gloss of the image is significantly reduced via this example halftone structure manipulation and clear visual difference can be observed between images so treated and those which are not.

Figure 4:
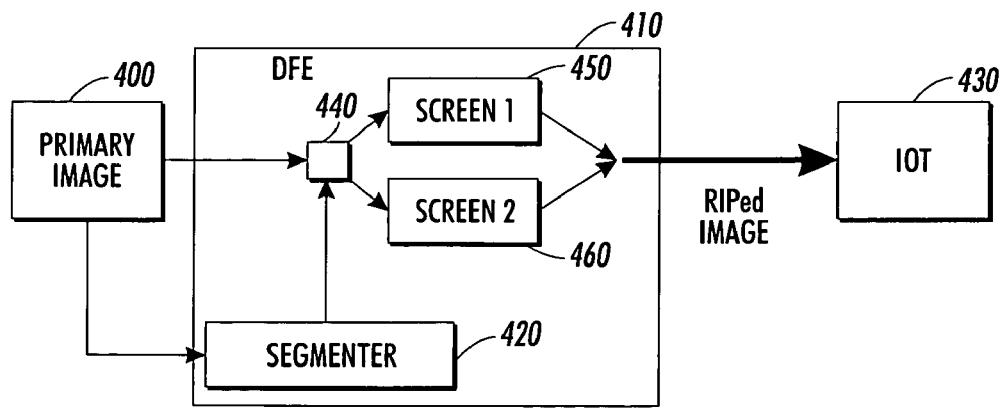
FIG. 4 shows one example embodiment for achieving image directed alternation of the halftone patterns for gloss manipulation as depicted in FIG. 3.

One approach for the assembly of a reduced differential gloss image is diagramed in FIG. 4. Here, the primary image 400 is received as input data to the digital front-end (DFE) 410 as is normal. However, a segmenter 420 also receives as input data primary image 400 as well. The processed image as sent to the image output terminal (IOT) 430 is grayscaled, the halftone density being driven by the primary image 400 data as is normal. However, the halftone type selection is driven by the output of segmenter 420 as input to multiplexer switch 440. The output of segmenter 420 will serve to direct a portion of the primary image 400 to use a first halftone type while directing an alternative halftone to be used for the remainder of primary image 400. Multiplexer 440 therefore toggles between either screen 1 type halftone 450 or screen 2 halftone type 460, as dictated by the segmenter 420, to produce the composite result of raster input processed (RIP) image data as passed to the IOT 430. In this way, a superimposition of halftone types having a reduced gloss differential between them is imbedded into the primary image 400 to provide a reduced gloss differential image at IOT 430.

The above described embodiments provide a methodology such that image gloss in a halftone region can be changed. However, these scenarios are limited in operational latitude in situations where background/solid image gloss needs to be modified. In these cases and in general, clear/invisible toner can be used to create more room for halftone structure manipulation while maintaining the image visual density/color. The "invisible" toner can be of any toner (colored or clear) that will not introduce any significant visual density/color difference within a certain image/color content. For more details on "invisible" toner, please see Ser. No. 10/876,001 entitled "ENHANCEMENT OF GLOSS-MARK IMAGES AT LOW AND HIGH DENSITIES".

In closing, by alternating between two halftone types, carefully selected such that each has identical matching density characteristics while displaying distinctly different apparent gloss will enable the reduction of differential gloss without the need for special toners or paper. This manipulation of gloss differentials will, of course, be best utilized with toner/ink and substrate systems which themselves best display inherent gloss characteristics. Examples of such systems comprise electrostaticgraphic and quality ink-jet systems. While wax based systems typically have less inherent gloss, they may well prove amendable to techniques which increase their inherent gloss. In just such a scenario, the teachings herein are anticipated to apply such wax based systems as well. It will be appreciated by those skilled in the art that these teachings will apply to both monochromatic, black and white, as well as color images and upon plain paper, glossy paper or transparencies. Those skilled in the art will also understand that this manipulation of inherent gloss differential will be weak where either there is a solid black area (solid toner/ink) or a white and therefore toner-less/ink-less area. That is because these areas will not best exhibit the inherent gloss of the selected halftones.

While the embodiments disclosed herein are preferred, it will be appreciated from this teaching that various alternative modifications, variations or improvements therein may be made by those skilled in the art. For example, it will be understood by those skilled in the art that the teachings provided herein may be applicable to many types of halftone cell types and arrangements including selecting more than two different halftone structures, as well being applicable to many types of toner/ink and substrate types. All such variants are intended to be encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for the manipulation of the differential gloss in a halftone image comprising the steps of:
    selecting a first halftone having a high apparent gloss characteristic;
    selecting a second halftone having a low apparent gloss characteristic while retaining an identical matching density characteristic to the first selected halftone;
    applying the first halftone to at least some portion of the halftone image; and,
    applying the second halftone to the remaining portion of the halftone image.

2. The method of claim 1 wherein the first halftone is a stochastic halftone type.

3. The method of claim 1 wherein the second halftone is a cluster dot halftone type.

4. The method of claim 1 wherein the second halftone is a 100~250 lines-per-inch cluster dot screen halftone type.

5. The method of claim 1 wherein the second halftone is a line screen halftone type.

6. A method for the manipulation of the differential gloss in a halftone image comprising the steps of:
    selecting a first halftone having a high apparent gloss characteristic;
    selecting a second halftone having a low apparent gloss characteristic while retaining an identical matching density characteristic to the first selected halftone;
    determining which areas of the halftone image correspond to potentially high gloss regions under normal printing conditions;
    applying the second halftone to those portions of the halftone image determined as corresponding to potentially high gloss regions; and,
    applying the first halftone to the remaining portions of the halftone image.

7. The method of claim 6 wherein the first halftone is a stochastic halftone type.

8. The method of claim 6 wherein the second halftone is a cluster dot halftone type.

9. The method of claim 6 wherein the second halftone is a 100~250 lines-per-inch cluster dot screen halftone type.

10. The method of claim 6 wherein the second halftone is a line screen halftone type.

11. The method of claim 6 wherein the determining step is based upon density.

12. The method of claim 6 wherein the determining step is based upon segmentation.

13. A method for the manipulation of the differential gloss in a halftone image comprising the steps of:
    selecting a first halftone having a high apparent gloss characteristic;
    selecting a second halftone having a low apparent gloss characteristic while retaining an identical matching density characteristic to the first selected halftone;
    determining which areas of the halftone image correspond to potentially low gloss regions under normal printing conditions;
    applying the first halftone to those portions of the halftone image determined as corresponding to potentially low gloss regions; and,
    applying the second halftone to the remaining portions of the halftone image.

14. The method of claim 13 wherein the first halftone is a stochastic halftone type.

15. The method of claim 13 wherein the second halftone is a cluster dot halftone type.

16. The method of claim 13 wherein the second halftone is a 100~250 lines-per-inch cluster dot screen halftone type.

17. The method of claim 13 wherein the second halftone is a line screen halftone type.

18. The method of claim 13 wherein the determining step is based upon density.

19. The method of claim 13 wherein the determining step is based upon segmentation.

20. A method for the manipulation of the differential gloss in a halftone image comprising the steps of:
   selecting a first halftone having a high apparent gloss characteristic;
   selecting a second halftone having a low apparent gloss characteristic while retaining an identical matching density characteristic to the first selected halftone;
   determining which areas of the halftone image correspond to potentially high gloss regions under normal printing conditions;
   determining which areas of the halftone image correspond to potentially low gloss regions under normal printing conditions;
   applying the first halftone to those portions of the halftone image determined as corresponding to potentially low gloss regions; and,
   applying the second halftone to those portions of the halftone image determined as corresponding to potentially high gloss regions of the halftone image.

21. The method of claim 20 wherein the first halftone is a stochastic halftone type.

22. The method of claim 20 wherein the second halftone is a cluster dot halftone type.

23. The method of claim 20 wherein the second halftone is a 100~250 lines-per-inch cluster dot screen halftone type.

24. The method of claim 20 wherein the second halftone is a line screen halftone type.

25. The method of claim 20 wherein the determining step is based upon density.

26. The method of claim 20 wherein the determining step is based upon segmentation.

* * * * *